(12) United States Patent
Hill

(10) Patent No.: US 8,487,759 B2
(45) Date of Patent: Jul. 16, 2013

(54) SELF ADAPTING HAPTIC DEVICE

(75) Inventor: Matthew Hill, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 391 days.

(21) Appl. No.: 12/750,054

(22) Filed: Mar. 30, 2010

(65) Prior Publication Data
US 2011/0075835 A1 Mar. 31, 2011

Related U.S. Application Data

(63) Continuation-in-part of application No. 12/571,326, filed on Sep. 30, 2009.

(51) Int. Cl.
*G08B 21/00* (2006.01)
(52) U.S. Cl.
USPC ........... 340/540; 340/541; 340/506; 340/517; 340/635; 455/550.1; 455/567; 455/574; 455/575.3
(58) Field of Classification Search
USPC ....... 340/540, 541, 506, 517, 635; 455/550.1, 455/567, 574, 575.3
See application file for complete search history.

(56) References Cited

U.S. PATENT DOCUMENTS

| | | | |
|---|---|---|---|
| 4,412,148 A | 10/1983 | Klicker et al. | |
| 5,245,734 A | 9/1993 | Issartel | |
| 5,293,161 A | 3/1994 | MacDonald et al. | |
| 5,434,549 A | 7/1995 | Hirabayashi et al. | |
| 5,436,622 A | 7/1995 | Gutman et al. | |
| 5,739,759 A * | 4/1998 | Nakazawa et al. | 340/7.62 |
| 5,818,149 A | 10/1998 | Safari et al. | |
| 5,951,908 A | 9/1999 | Cui et al. | |
| 6,342,880 B2 | 1/2002 | Rosenberg et al. | |
| 6,373,465 B2 | 4/2002 | Jolly et al. | |
| 6,408,187 B1 | 6/2002 | Merriam | |
| 6,438,393 B1 | 8/2002 | Surronen | |
| 6,864,877 B2 | 3/2005 | Braun et al. | |
| 6,952,203 B2 | 10/2005 | Banerjee et al. | |
| 6,995,752 B2 | 2/2006 | Lu | |
| 7,123,948 B2 | 10/2006 | Nielsen | |
| 7,253,350 B2 * | 8/2007 | Noro et al. | 84/600 |
| 7,348,968 B2 | 3/2008 | Dawson | |

(Continued)

FOREIGN PATENT DOCUMENTS

| | | |
|---|---|---|
| CN | 101409164 | 4/2009 |
| EP | 0483955 | 5/1992 |

(Continued)

OTHER PUBLICATIONS

Hasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

(Continued)

*Primary Examiner* — Tai T Nguyen
(74) *Attorney, Agent, or Firm* — Dorsey & Whitney LLP

(57) ABSTRACT

Methods and apparatuses are disclosed that allow an electronic device to autonomously adapt one or more user alerts of the electronic device. For example, some embodiments may include a method for operating a haptic device including driving a haptic device using a control signal, measuring a frequency related to the operation of the haptic device and comparing the measured frequency with a target frequency. A control signal is adjusted based on the comparison to drive the haptic device to the target frequency.

6 Claims, 11 Drawing Sheets

U.S. PATENT DOCUMENTS

| | | | |
|---|---|---|---|
| 7,392,066 B2 * | 6/2008 | Haparnas | 455/567 |
| 7,423,631 B2 | 9/2008 | Shahoian et al. | |
| 7,446,752 B2 | 11/2008 | Goldenberg et al. | |
| 7,508,382 B2 | 3/2009 | Denoue et al. | |
| 7,569,086 B2 | 8/2009 | Kikuchi et al. | |
| 7,679,611 B2 | 3/2010 | Schena | |
| 7,710,399 B2 | 5/2010 | Bruneau et al. | |
| 7,798,982 B2 | 9/2010 | Zets et al. | |
| 7,952,261 B2 | 5/2011 | Lipton et al. | |
| 7,952,566 B2 | 5/2011 | Poupyrev et al. | |
| 7,956,770 B2 | 6/2011 | Klinghult et al. | |
| 7,961,909 B2 | 6/2011 | Mandella et al. | |
| 8,081,156 B2 | 12/2011 | Ruettiger | |
| 8,232,494 B2 | 7/2012 | Purcocks | |
| 8,253,686 B2 | 8/2012 | Kyung et al. | |
| 2004/0021663 A1 | 2/2004 | Suzuki et al. | |
| 2004/0127198 A1 | 7/2004 | Roskind et al. | |
| 2005/0057528 A1 | 3/2005 | Kleen | |
| 2005/0107129 A1 | 5/2005 | Kaewell et al. | |
| 2005/0248549 A1 | 11/2005 | Dietz et al. | |
| 2006/0154674 A1 | 7/2006 | Landschaft et al. | |
| 2006/0209037 A1 | 9/2006 | Wang et al. | |
| 2006/0252463 A1 | 11/2006 | Liao | |
| 2007/0099574 A1 | 5/2007 | Wang | |
| 2007/0152974 A1 | 7/2007 | Kim et al. | |
| 2008/0036591 A1 * | 2/2008 | Ray | 340/540 |
| 2008/0084384 A1 | 4/2008 | Gregorio et al. | |
| 2008/0158149 A1 | 7/2008 | Levin | |
| 2008/0197901 A1 | 8/2008 | Cruz-Hernandez et al. | |
| 2008/0252594 A1 | 10/2008 | Gregorio et al. | |
| 2008/0291620 A1 | 11/2008 | DiFonzo et al. | |
| 2009/0128503 A1 | 5/2009 | Grant et al. | |
| 2009/0167542 A1 * | 7/2009 | Culbert et al. | 340/635 |
| 2009/0167702 A1 | 7/2009 | Nurmi | |
| 2009/0167704 A1 | 7/2009 | Terlizzi et al. | |
| 2009/0225046 A1 | 9/2009 | Kim et al. | |
| 2009/0267892 A1 | 10/2009 | Faubert | |
| 2009/0267920 A1 | 10/2009 | Faubert et al. | |
| 2009/0313542 A1 | 12/2009 | Cruz-Hernandez et al. | |
| 2010/0048256 A1 * | 2/2010 | Huppi et al. | 455/574 |
| 2010/0053087 A1 | 3/2010 | Dai et al. | |
| 2010/0194547 A1 | 8/2010 | Terrell et al. | |
| 2010/0328229 A1 | 12/2010 | Weber et al. | |
| 2011/0012717 A1 | 1/2011 | Pance et al. | |
| 2011/0077055 A1 | 3/2011 | Hill | |
| 2011/0128239 A1 | 6/2011 | Polyakov et al. | |
| 2011/0175692 A1 | 7/2011 | Niiyama | |
| 2012/0068957 A1 | 3/2012 | Puskarich et al. | |
| 2012/0127088 A1 | 5/2012 | Pance et al. | |
| 2012/0223824 A1 | 9/2012 | Rothkopf | |
| 2012/0286943 A1 | 11/2012 | Rothkopf et al. | |
| 2012/0319827 A1 | 12/2012 | Pance et al. | |

FOREIGN PATENT DOCUMENTS

| | | |
|---|---|---|
| EP | 1047258 | 10/2000 |
| EP | 1686776 | 8/2006 |
| EP | 2073099 | 6/2009 |
| JP | 2004236202 | 8/2004 |
| KR | 20050033909 | 4/2005 |
| WO | WO97/16932 | 5/1997 |
| WO | WO02/073587 | 9/2002 |
| WO | WO2006/057770 | 6/2006 |
| WO | WO2007/114631 | 10/2007 |
| WO | WO2008/075082 | 6/2008 |
| WO | WO2009/038862 | 3/2009 |
| WO | WO2009/068986 | 6/2009 |
| WO | WO2009/097866 | 8/2009 |
| WO | WO2009/122331 | 10/2009 |
| WO | WO2009/150287 | 12/2009 |
| WO | WO2010/087925 | 8/2010 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

International Search Report, PCT/US2010/050894, 4 pages, Feb. 17, 2011.

Combined Search and Examination Report, GB1016379.8, 13 pages, Jan. 17, 2011.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

SELF ADAPTING HAPTIC DEVICE

CROSS-REFERENCE TO RELATED APPLICATIONS

The present application is a continuation-in-part patent application of U.S. patent application Ser. No. 12/571,326, filed on Sep. 30, 2009, and titled "Self Adapting Alert Device," the contents of which are hereby incorporated by reference herein in their entirety.

BACKGROUND

I. Technical Field

The present invention relates generally to haptic devices in electronic systems, and more particularly to a self adapting haptic device.

II. Background Discussion

Electronic devices are ubiquitous in society and can be found in everything from wristwatches to computers. Many of these electronic devices are portable and also include the ability to obtain a user's attention through the use of an alert device. For example portable electronic devices like cellular phones and watches contain alert devices such as vibrating motors, speakers, and/or lights to attract the user's attention. Because of their portable nature, many of these portable electronic devices are made as small as possible by miniaturizing the components therein. As part of this miniaturization effort, the alert devices in the electronic devices are often made as small as possible in order to conserve space. However, these miniaturized alert devices can be problematic for several reasons.

First, these miniaturized alert devices may be inadequate to obtain the user's attention in a variety of different situations. For example, if the user of a cell phone is in an environment where there is a great deal of ambient noise, such as a concert or live sporting event, then the user may be unable to see a visual alert from a miniaturized light on the phone, hear an auditory alert from a miniaturized speaker in the phone and/or unable to detect vibration coming from the phone's miniaturized vibration motor.

Additionally, because of electronic devices often contain slight variations in the way they were manufactured, the actual response of the alert device within the electronic device may vary between electronic devices. In other words, slight variations in the actual manufacturing of an electronic device may cause the electronic device to react differently to the same force driving the alert device. For example, the vibration frequency may vary between phones of the same make and model because of manufacturing tolerance, and therefore, the same amount of vibration from a vibrating motor may unintentionally produce different levels of user alerts. Furthermore, performance variation may occur over time due to bearing wear, dust, oxides on brushes, and/or temperature changes.

Thus, methods and systems that adaptively adjust the alert devices within electronic devices to overcome one or more of these problems are desirable.

SUMMARY

Methods and apparatuses are disclosed that allow an electronic device to autonomously adapt one or more user alerts of the electronic device. For example, some embodiments may include a method for operating a haptic device including driving a haptic device using a control signal, measuring a frequency related to the operation of the haptic device and comparing the measured frequency with a target frequency. A control signal is adjusted based on the comparison to drive the haptic device to the target frequency.

Other embodiments may include an electronic device that autonomously adjusts at least one operating parameter of a haptic device. The electronic device includes a haptic device and a sensor configured to monitor the haptic device during operation of the haptic device. A feedback loop is provided that includes a filter coupled to the sensor and an error detector coupled to the filter, wherein the error detector is configured to compare a measured signal with a target signal to generate an error signal. A controller configured to receive the error signal and adjust a control signal in response to the error signal to achieve a desired operational parameter is also provided.

Still other embodiments may include a method of adjusting user alerts in an electronic device. The method including initiating operation of a haptic device by overdriving a control signal provided to the haptic device and actively braking a motor of the haptic device to stop operation of the haptic device.

BRIEF DESCRIPTION OF THE DRAWINGS

The use of the same reference numerals in different drawings indicates similar or identical items.

DETAILED DESCRIPTION OF THE INVENTION

Embodiments of electronic devices are disclosed that allow the electronic device to autonomously observe its current operating condition and adjust its user alerts accordingly. The electronic device may determine its current operating environment (e.g., indoors, outdoors, contained in a purse or bag, etc.) through a series of sensor measurements. Based upon these sensor measurements the electronic device may both select and/or optimize the user alerts to suit the current operating environment. For example, some embodiments may utilize the sensor measurements to determine which of the possible user alerts is best suited to the current operating environment of the electronic device—e.g., if the current operating environment is indoors in a conference room, then the auditory alerts may not be the most suitable user alert in this operating environment. Other embodiments may utilize the sensor measurements to optimize the user alerts. For example some embodiments may include operating a motor to cause the electronic device to vibrate and obtain the user's attention through tactile sensation. In these embodiments, the sensor measurements may be utilized to actively tune the motor such that the electronic device achieves a target frequency that best corresponds to the current operating environment of the electronic device.

Although one or more of the embodiments disclosed herein may be described in detail with reference to a particular electronic device, the embodiments disclosed should not be interpreted or otherwise used as limiting the scope of the disclosure, including the claims. In addition, one skilled in the art will understand that the following description has broad application. For example, while embodiments disclosed herein may focus on portable electronic devices such as cell phones, it should be appreciated that the concepts disclosed herein equally apply to other portable electronic devices such as the IPOD brand portable music player from Apple Inc. In addition, it should be appreciated that the concepts disclosed herein may equally apply to non-portable electronic devices, such as computer equipment (keyboard, mice, etc.) and/or gaming devices (e.g., gaming controllers). Furthermore, while embodiments disclosed herein may focus on optimizing the vibration output of the electronic devices, the concepts disclosed herein equally apply to other forms of user alerts, such as sound devices and/or light devices. Accordingly, the discussion of any embodiment is meant only to be exemplary and is not intended to suggest that the scope of the disclosure, including the claims, is limited to these embodiments.

Figure 1:
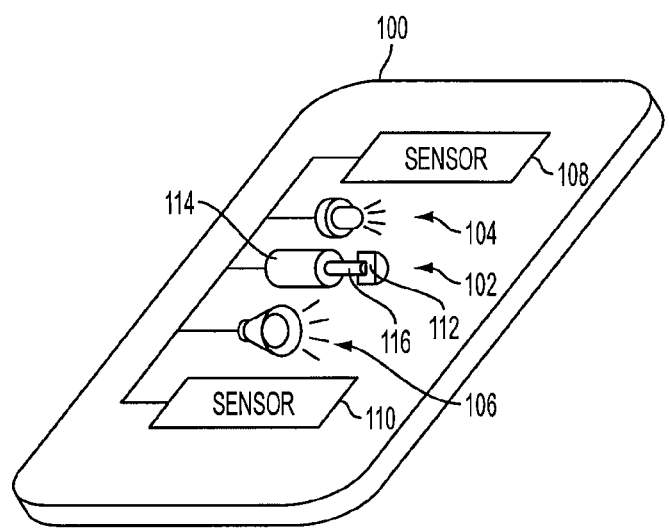
FIG. 1 illustrates an electronic device capable of self adapting one or more of its alert devices to obtain the attention of a user in different environments.

FIG. 1 illustrates an electronic device 100 capable of autonomously adjusting one or more of its alert devices to obtain the attention of a user of the electronic device 100 in different environments. For the sake of discussion, the electronic device 100 is shown in FIG. 1 as a cell phone, such as an IPHONE brand cell phone from Apple Inc. The electronic device 100 may include one or more alert devices capable of obtaining the attention of the user of the electronic device 100, including a vibration motor 102, a light source 104, and/or a speaker 106. FIG. 1 also shows that these alert devices 102, 104, and 106 may be coupled to one or more sensors 108 and 110 located within the electronic device 100. As will be discussed in greater detail below, the sensors 108 and 110 in the electronic device 100 may include devices that measure indications about the environment in which the electronic device 100 is operating. These measurements may include the movement, proximity to the user, location, whether the user is holding the electronic device 100, ambient light levels, and/or ambient noise levels experienced by the electronic device 100 to name just a few.

In some embodiments, the sensors 108 and 110 may be configured to provide a primary functionality, such as receiving user or environmental input related to applications or programs running on the device. These sensors may be repurposed or additionally used to provide secondary functionality for the device. "Secondary functionality" generally refers to the use of one or more sensors for an operation, or to provide input or output, other than their primary purpose. Thus, a temperature sensor configured to monitor the heat of a casing may also be used to detect a rise in heat from the presence of a user's hand as "secondary functionality."

As another example of secondary functionality, sensor(s) may be used to determine the operating parameters of haptic devices. As a more specific example, measurements from an accelerometer are often primarily used to determine an orientation of the device 100. However, in some instances, the signals outputted by the accelerometer may be used with interactive software (such as a video game) to provide an additional input device for user gameplay, thereby providing secondary functionality for the accelerometer. Continuing this example, the accelerometer may be repurposed for determining the operation of a haptic device. For example, when the haptic device operates, the accelerometer may be used to indirectly measure the operating parameters (such as frequency) of the haptic device to determine whether there is degradation in the haptic feedback. The accelerometer may compare the range of motion of the haptic device during operation to a stored profile to determine if the haptic feedback is too great or too weak. A feedback control loop may be provided to correct for any deviance from a determined operating range, as described in detail below.

Figure 2:
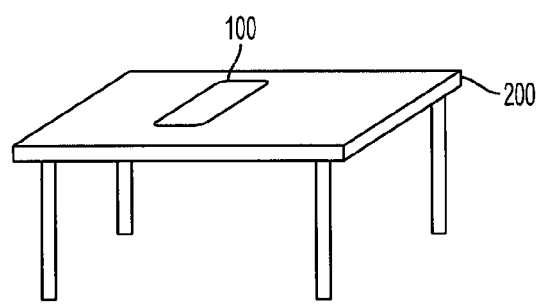
FIG. 2 illustrates one operating environment for the electronic device.
Figure 3:
FIG. 3 illustrates an alternate operating environment for the electronic device.

Based these measurements, the electronic device 100 may autonomously decide the most effective way to obtain the user's attention in that particular environment. FIGS. 2 and 3 illustrate two distinct operating environments for the electronic device 100, where the alert used to obtain the user's attention may vary between these two operating environments. Referring first to the operating environment shown in FIG. 2, the electronic device 100 may be lying flat on a table 200 such as may be the case when the user is in a classroom or meeting. If the sensors 108 and 110 are implemented as an accelerometer and microphone respectively, then the electronic device 100 may detect that it is in a classroom or meeting by the sensors 108 and 110 reporting no movement from the accelerometer and/or a relatively low ambient noise level from the microphone. Upon detecting that it is operating in this environment, the electronic device 100 may silence any audible alerts to the user, such as when there is an incoming phone call.

Conversely, FIG. 3 illustrates a user 300 carrying the electronic device 100 in a purse 305 where it may be jostled around. If the sensors 108 and 110 are implemented as an accelerometer and an ambient light sensor (ALS) respectively, then the electronic device 100 in this operating environment may detect that it is in a confined space that is dark by the ALS reporting a relatively low ambient light level and that the electronic device 100 is being moved around by the accelerometer reporting movement. This operating environment may require louder user alerts than the situation shown in FIG. 2, for example, the strength of user alerts, both auditory and vibrations, may be increased in these situations.

Referring again to the electronic device 100 shown in FIG. 1, the motor 102 shown includes an eccentric weight 112 coupled to a motor body 114 via a shaft 116. When an electric signal, such as a voltage signal, is applied to the motor body 114, the shaft 116 begins to rotate causing the weight 112 to move in a substantially orbital path. Because the weight 112 is uneven, as the weight 112 begins to be rotated in this substantially orbital path, the motor 102 begins to vibrate, and as a result, the motor 102 causes the entire electronic device 100 to vibrate. When the electronic device 100 is deployed in different operating environments, the maximum target frequency of the electronic device 100, or frequency at which the entire electronic device 100 experiences its maximum vibration, may vary between different operating environments. For example, comparing the two operating environments shown in FIGS. 2 and 3, the electronic device 100 making physical contact with the table 200 will have a different target frequency than the same electronic device 100 being jostled around in the purse 305. By monitoring the sensors 108 and 110 based upon these measured parameters, the target frequency of the electronic device in these different operating environments may be determined. Furthermore, by actively adjusting the vibration of the motor 102 based upon these measured parameters, the electronic device 100 may be adjusted to achieve this target frequency in different operating environments. That is, the electronic device 100 may actively "tune" itself to its target frequency using measurements obtained from the sensors 108 and 110 and adjusting the motor 102. In the embodiments where the electronic device 100 is a phone, this active adjustment may occur within the period of a single ring of the phone, such that the phone is ringing at its target frequency before the end of the first ring of an incoming call to maximize the chances of obtaining the user's attention. Similarly, when the electronic device 100 is a multi-function device that includes the ability to check electronic mail, this active adjustment may occur within the period of time it takes to notify the user of a new mail event.

Figure 4:
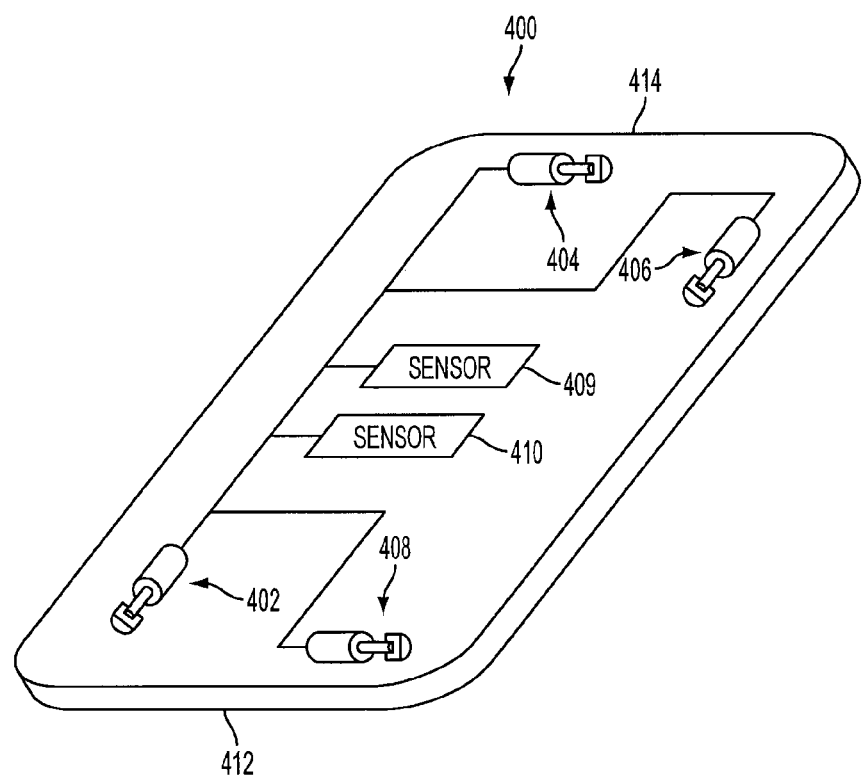
FIG. 4 illustrates an alternate embodiment of an electronic device that includes a plurality of motors.

FIG. 4 illustrates an alternate embodiment of an electronic device 400, which includes a plurality of motors 402-408 coupled to the sensors 409 and 410. As shown, in this embodiment, the plurality of sensors 402-408 may be in different locations within the electronic device 400 so as to vibrate different portions of the electronic device 400. In this embodiment, the target frequency of the electronic device 400 may be achieved by actuating the plurality of motors 402-408 in different patterns, where the pattern of actuating the plurality of motors 402-408 varies according to the different operating environments of the electronic device 400. For example, if the electronic device 400 is located within the purse 305 as shown in FIG. 3 and the sensors 409 and 410 indicate that one end 412 of the electronic device is touching the bottom of the purse 305 and the other end 414 is not touching the bottom of the purse 305, then the motors 402 and 408 may be actuated to achieve the target frequency of the electronic device 400 while the other motors in the plurality 404 and 406 are not actuated. Thus, the electronic device 400 may be tuned to its target frequency in different environments by selectively actuating one or more of the motors within the plurality 402-408.

Figure 5:
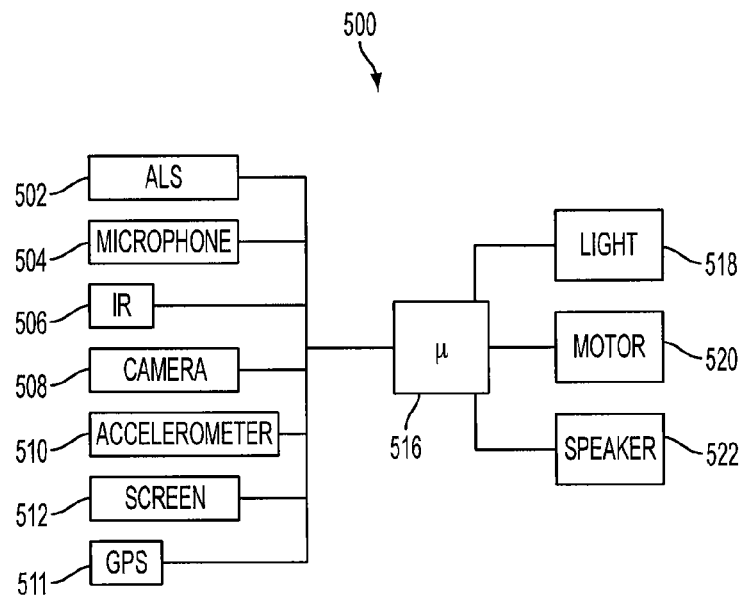
FIG. 5 illustrates a block diagram of an electronic device capable of self adapting one or more of its alert devices to obtain the attention of a user in different environments.

FIG. 5 illustrates a block diagram of an electronic device 500 that may be employed in the embodiments shown above. As shown, the electronic device 500 includes a plurality of sensors 502-512 that couple to a processor 516. These sensors 502-512 may be used alone or in combination to determine the current operating environment of the electronic device 500. The microprocessor 516 may be further coupled to one or more alert devices 518-522.

As was mentioned above, the ALS 502 senses the ambient light of the environment that the electronic device 500 is in and reports this information to the processor 516. When the processor 516 receives this ambient light information, it can modify alert operations of the electronic device 500 accordingly. Thus, in the embodiments where the electronic device 500 is a phone, if ambient light measurements indicate that the level of ambient light is relatively high, then alert mechanisms other than the light 518 may be used to obtain the user's attention, such as the motor 520 and/or speaker 522, because the light 518 may be unperceivable to the user because the ambient light conditions. As was mentioned above, the information from the sensors may be combined such that the ambient light measurement from the ALS 502 may be used in conjunction with other measurements, such as ambient noise level, to detect a current operating environment of the electronic device 500.

The microphone 504 may sample the ambient noise level of the environment that the electronic device 500 is in and report this information to the processor 516. Thus, the microphone 504 may indicate that the ambient noise level is too high for the speaker 522 to obtain the user's attention, and therefore, alert mechanisms other than the speaker 522 may be used to obtain the user's attention, such as the motor 520 and/or the light 518. In the embodiments where the electronic device 500 is a phone, then the microphone 504 may be the microphone used by the user of the electronic device 500 when using the phone.

The infrared (IR) detector 506 may detect a user's proximity to the electronic device 500 and report this information to the processor 516. In some embodiments, the IR detector 506 may include one or more solid state sensors, such as pyroelectric materials, which detect heat from a user's body being near the electronic device 500. In other embodiments, the IR sensor may include a light emitting diode (LED) that emits infrared light which bounces off a user in close proximity to the electronic device 500 and is detected by an IR sensor that is based upon a charge coupled device (CCD), where the CCD may detect reflected IR light emitted by the LEDs. In still other embodiments, a photoresistor may be used in place of or in conjunction with the CCD. Regardless of the actual implementation of the IR detector 506, the IR detector 506 may convey its signal to the processor 516 as an indication of a user's presence near the electronic device 500, and this indication may be used in conjunction with one or more of the other sensors to determine the current operating environment of the electronic device 500.

The camera 508 may capture certain visual queues for use in determining the operating environment of the electronic device 500. In some embodiments, the camera 508 may be integrated within the ALS 502. In other embodiments, the camera 508 may be located on a separate portion of the electronic device 500 and may be used to confirm measurements from one of the other sensors, such as the ALS 502. For example, in the event that the electronic device 500 is implemented as a phone and the ALS 502 is positioned on one side of the phone, such as the face side that the user positions against their head when using the phone, and the camera 508 is positioned on the opposite side of the electronic device 500 as the ALS 502, then the camera 508 may be used to confirm measurements indicating that the phone is in a certain operating environment.

Furthermore, in some embodiments, measurements from the camera 508 may be used to provide additional information regarding the operating environment of the electronic device 500. For example, if the electronic device 500 is implemented as the phone shown in FIG. 2, where the phone is lying face down, and the ALS 502 is located on the face of the phone while the camera 508 is located on the opposite side of the phone, then by the ALS 502 indicating that it is receiving substantially no light while the camera 508 indicates that it is receiving light, then may indicate that the phone is lying face down on the table.

The accelerometer 510 may indicate the general orientation of the electronic device 500. In some embodiments, this indication may be through measurement of a damped mass on an integrated circuit, such as a micro electro-mechanical system (MEMS) For example, the accelerometer 510 may include one or more "in-plane" MEMS accelerometers, which are sensitive in a plane that is parallel to the sensing element (such as the damped mass), and therefore multiple dimension (such as two and three dimension accelerometers) may be formed by combining two or more in-plane accelerometers orthogonal to each other. Other embodiments may utilize out-of-plane MEMS accelerometers, which are sensitive to positional movements in a direction that is in a plane that is perpendicular to the sensing element (sometimes referred to as Coriolis movement). Some embodiments may combine one or more in-plane MEMS sensors with one or more out-of-plane MEMS sensors to form the accelerometer 510. As mentioned above, the accelerometer 510 may be used to determine orientation of the electronic device 500 (such as face up, face down, tilted, etc.) and/or whether the electronic device 500 is being jostled about by the user (such as inside of the purse 305 shown in FIG. 3). By providing the measurements from the accelerometer 510 to the processor 516 in addition to measurements from other sensors, the processor 516 may combine the measurements and confirm of the other sensors. For example, if the combination of the ALS 502 and the camera 508 indicate that the electronic device 500 is lying face down (as discussed above with regard to FIG. 2), then the processor 516 may utilize measurements from the accelerometer 510 to confirm this positional information.

The global positioning system (GPS) sensor 511 may indicate the position of the electronic device 500 with respect to the latitude and longitude coordinates of the Earth as determined by signals from a plurality of geosynchronous satellites orbiting the Earth. Since the GPS sensor 511 may be unable to receive satellite signals while indoors, the GPS sensor 511 may be used to detect whether the electronic device 500 is indoors or outdoors, and the processor 516 may adjust the alerts accordingly.

The capacitive screen sensor 512 may detect whether the user is making contact with the electronic device 500, and/or how much contact the user is making with the electronic device. For example, if the user is holding the electronic device 500 in their pocket, then the capacitive screen sensor 512 may indicate a certain capacitance level associated with the user's body. On the other hand, in the event that the electronic device 500 is located the purse 305 as shown in FIG. 3, then the capacitive screen sensor 512 may indicate a different capacitance associated with the fabric of the purse 305. Also, when the capacitive screen sensor 512 senses substantially no capacitance value, then the electronic device 500 may be on a table 200 as shown in FIG. 2.

Table 1 illustrates how values from the capacitive screen sensor 512 may be confirmed by the other sensors, such as the ALS 502. For example, when the ALS indicates that the ambient light level is low, such as when the phone may be in a pocket or in the purse 305, then the capacitive screen sensor 512 may be consulted by the processor 516 to determine if the capacitance value corresponds to human versus non-human capacitance so that the processor 516 may determine the operating environment an adjust the user alerts accordingly. Similarly, in the event that the capacitive screen sensor 512 indicates that substantially no capacitance is measured, then the ALS 502 may be consulted to determine if the light level is high indicating that the operating environment is on the table 200 in a bright room or, if the light level is low, indicating that the operating environment is on the table 200 in a dark room, such as a night stand. The processor 516 then may adjust the alerts accordingly, such as by silencing alerts from the speaker 522 in the event that the electronic device 500 is on a night stand.

TABLE 1

| | | ALS 502 | |
|---|---|---|---|
| | | High | Low |
| Capacitive Screen Sensor 512 | Full screen, human | | In pocket |
| | Full screen, non-human | | In purse |
| | Nothing | On conference table | On night-stand |

Figure 6:
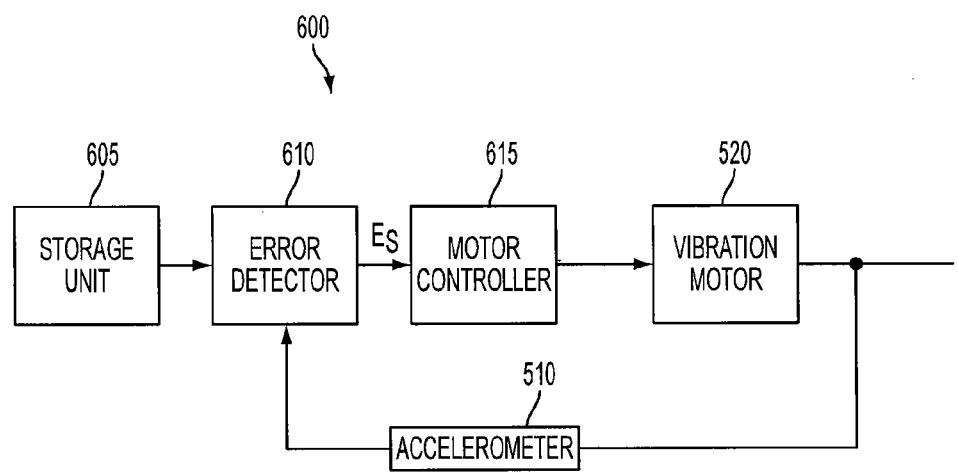
FIG. 6 illustrates a feedback and control system that may allow the electronic device to achieve a target frequency that is customized to the current operating environment.

Referring still to FIG. 5, each of the sensors 502-512 may be used by the processor to optimize the performance of the light 518, the motor 520 and/or the speaker 522 to the operating environment of the electronic device 500. FIG. 6 depicts a block diagram of an illustrative feedback and control system 600 that may be implemented by the electronic device 500 to control the motor 520 such that its movement allows the electronic device 500 to achieve a target frequency that is customized to the operating environment. As shown in block 605 of FIG. 6, the control system 600 may include a storage unit 605 that includes a reference value that is reported to other items in the control system 600. For the sake of discussion, this disclosure will discuss the reference value as based upon an accelerometer measurement, although it should be appreciated that this measurement may be based upon a wide variety of sensors, such as one or more of the sensors 502-512. Also, the reference value in the storage unit 605 may be a combination of measurements from more than one of the sensors 502-512.

The control system 600 may include an error detector 610 coupled to the storage unit 605 and the accelerometer 510. The accelerometer 510 may report its measurements to the error detector 610 in the same form as the reference measurements stored in the storage unit 605. As was mentioned above, measurements from the accelerometer 510 may represent movement of the electronic device 500 in the current operating environment of the electronic device 500, and as a result, the measurements from the accelerometer 510 may be used to measure the target frequency of the electronic device 500. During operation, the error detector 610 may compare the reference value stored in the storage unit 605 with the current measurement from the accelerometer 510 and output an error signal $E_s$.

The error detector 610 may couple to a motor controller 615 and thereby provide the error signal $E_s$ to the controller 615. The controller 615 may utilize the error signal $E_s$ in controlling the input signals to the motor 520, such as by generating a control signal that is proportional to the difference between the reference value stored in the storage unit 605 and the accelerometer 510. As mentioned above, the electrical signal applied to the motor 520 may be a voltage, and therefore, the control signal generated by the motor controller 615 may vary one or more aspects of the voltage that is applied to the motor 520. For example, control of the motor 520 may be accomplished by varying the amplitude, frequency, and/or duty cycle of the voltage that is applied to the motor 520.

In some embodiments, the motor 520 may be controlled using a pulse width modulated (PWM) signal. This PWM signal may allow more robust control of the motor 520 than conventional methods, such as an on/off control. In these embodiments, the PWM signal may be used to initially overdrive the motor 520 to reduce the rise time or 'spin up' for the motor 520 thereby producing a sharper turn on of the motor 520. Similarly, in these embodiments, the PWM signal may be used to underdrive the motor 520, or inductively brake the motor 520, so as to achieve a sharper turn off of the motor 520. This sharper on and off action of the motor 520 may result in more noticeable tactile sensations to a user when using the motor 520 as an alert device.

Figure 7:
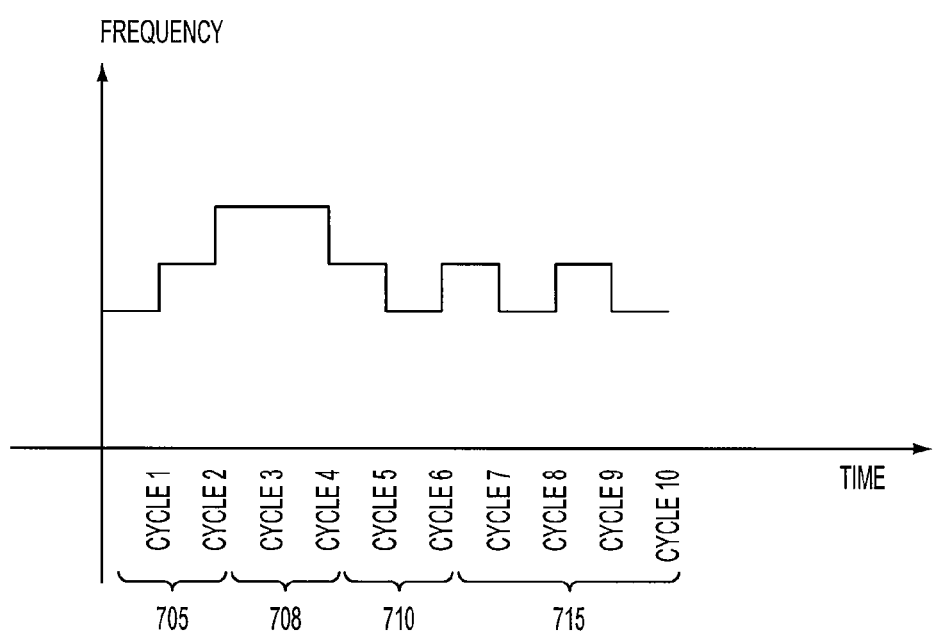
FIG. 7 illustrates a control signal that may be generated by the feedback and control system shown in FIG. 6.

FIG. 7 illustrates varying the frequency of the control signal where the frequency varies with respect to time. Note that the varying frequency may be monotonically increasing during each cycle of the control system 600 (section 705), unchanged during each cycle of the control system 600 (section 708), monotonically decreasing during each iteration of the control system 600 (section 710), or be dithered between two or more values during each cycle of the control system 600 (section 715).

Referring back to the control system 600 shown in FIG. 6 in conjunction with the electronic device 500 shown in FIG. 5, in some embodiments, the storage unit 605, error detector 610, and motor controller 615 may be incorporated into the microprocessor 516. Thus, during operation, the microprocessor 516 may sample values from the accelerometer 510 (which represents movement of the electronic device 500 within its current operating environment) and actively control the motor 520 such that the error signal $E_s$ is minimized and the reference value stored in the storage unit 605 is achieved. The reference value that is stored in the storage unit 605 may be modified autonomously by the electronic device so that the control system 600 is actively tuning itself to this changing reference value. By changing the reference value stored in the storage unit 605, and tracking the measurements from the accelerometer 510 in response to this varying reference value, the target frequency of the electronic device 500 in its current operating environment may be calculated. For example, as the reference value is varied, the reference value that causes the electronic device 500 to achieve maximum resonance in the current operating environment (as measured by the accelerometer 510), may be stored in the storage unit 605.

Figure 8:
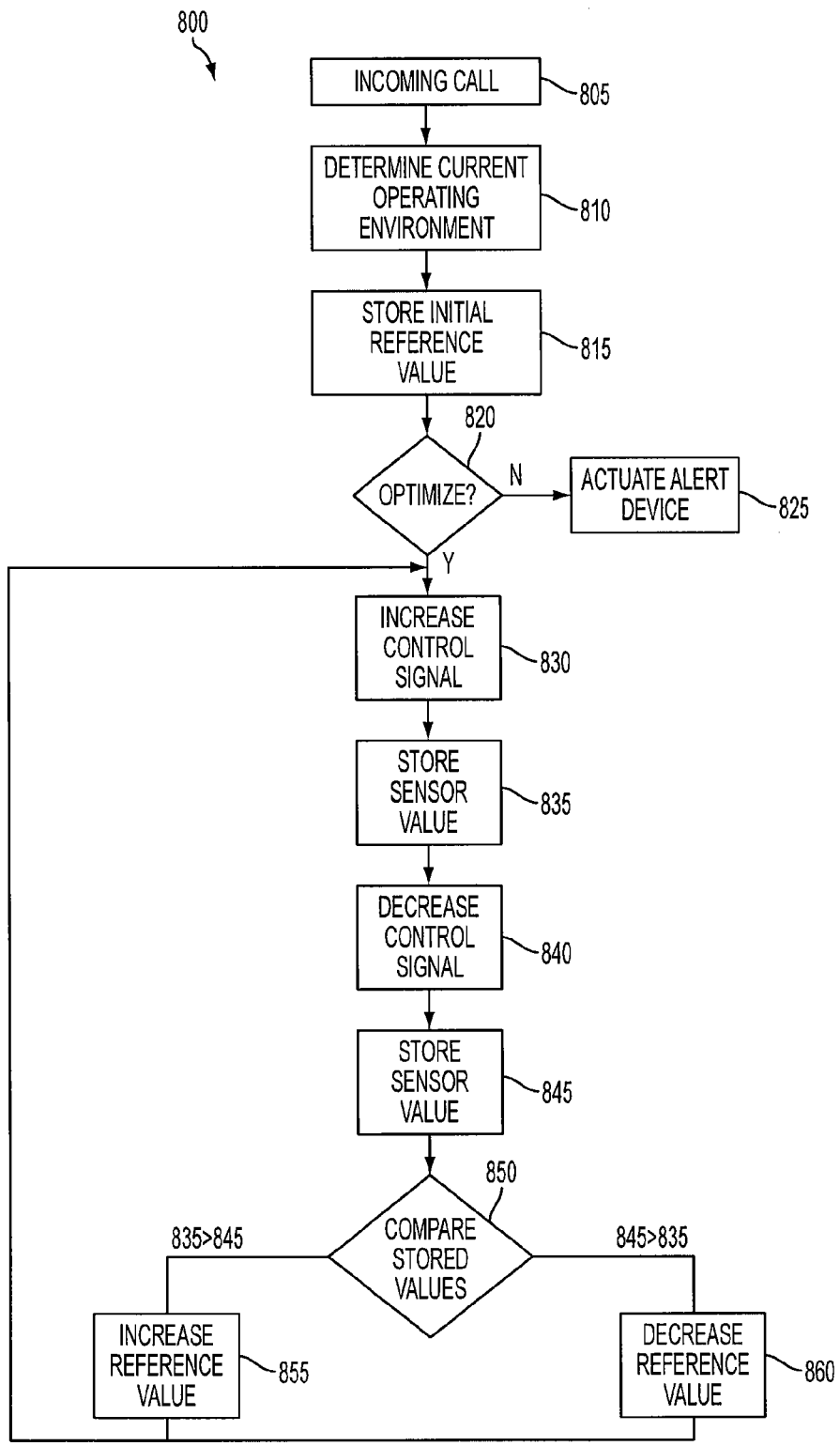
FIG. 8 illustrates operations for determining a reference value corresponding to a maximum target frequency corresponding to a current operating environment of the electronic device.

FIG. 8 illustrates operations 800 for determining a reference value corresponding to a target frequency of the electronic device. The target frequency of the electronic device may be a resonant frequency of the electronic device 500 in its current operating environment, or alternatively, may be a frequency of the device that maximizes a user's perception of the alert. It should be appreciated that the operations shown in FIG. 8 are illustrative, and that other operations for determining a reference value may be performed in other embodiments. The operations 800 are discussed herein in the context of the electronic device 500 being a phone that is receiving an incoming call, however, the operations 800 may be applied in other contexts, such as in the context of a personal digital assistant (PDA) alerting a user to an appointment for example.

Referring now to FIG. 8, block 805 shows the electronic device 500 receiving an incoming call. Generally, the duration of a single ring for an incoming call may be five seconds and the phone may ring for a total of five rings before being transferred to voicemail, or twenty five seconds. In some embodiments, the operations 800 may be triggered when the electronic device 500 beings to ring on the first ring and complete within this first ring, and therefore the block 805 occur on first ring. In other embodiments, the operations 800 may occur on a subsequent ring and complete within that subsequent, and therefore the block 805 may be a subsequent ring. In still other embodiments, the operations 800 may begin at the beginning of the first ring and complete before the phone transfers the call to voicemail.

Once the electronic device 500 receives an incoming call, the electronic device 500 will detect the current system state per block 810. For example, the microprocessor 516 may observe the values of one or more of the sensors 502-512 to determine their values, and as was discussed above, based upon one or more of these measurements, the electronic device 500 may predict the operating environment of the electronic device (e.g., on a table as shown in FIG. 2 versus in the purse 305 as shown in FIG. 3).

Next, in block 815, the initial reference value may be loaded into the storage unit 610. The initial reference value to be stored may correspond to an initial estimation of the reference value that matches the current operating environment. For example, momentarily to FIGS. 3 and 6, if the processor 516 determines that the phone is in the purse 305, then the processor 516 may consult a lookup table to determine a predetermined reference value to be stored in the storage unit 605 such that the initial target frequency achieved by the control system 600 generally corresponds to the phone being located in the purse 305. This initial target frequency stored in the storage unit 605 may be optimized by subsequent operations.

Referring back to FIG. 8, block 820 includes a decision block to determine whether the initial reference value is to be optimized. In the event that no optimization is desired, such as when the control system 600 determines that the initial reference value achieves a target frequency that is within a threshold of a predetermined maximum target frequency, then control may flow to block 825, where the motor 520 may be actuated corresponding to the initial reference value.

On the other hand, in the event that the block 820 determines that optimization is desired, then a dithering process may be utilized to determine the target frequency of the electronic device 500. This dithering process may begin in block 830 where the control signal provided to the motor 520 may be increased, for example, by increasing the frequency as illustrated in the section 705 of FIG. 7. In block 835, each time the control signal is increased by the controller 615, this value may be stored for determination of the target frequency of the electronic device 500. Next, in block 840 the control signal provided to the motor 520 may be decreased, for example, by decreasing the frequency with the controller 615 as illustrated in the section 710 of FIG. 7. In block 845, each time the control signal is decreased, this value may be stored for determination of the target frequency of the electronic device 500.

Next, in block 850, the microprocessor 516 may compare the values stored in blocks 835 and 845 and adjust the reference value in the storage unit 605 accordingly. For example, if the value stored during block 835 is greater than the value stored during block 845, then increasing the control signal per block 830 may result in the electronic device 500 getting closer to its target frequency than decreasing the control signal per block 840. Thus, the controller 615 may increase the frequency of the control signal to the motor 520 by increasing the reference value stored in the storage unit 605 per block 855 and then control may flow back to block 830 where the dithering process begins again.

Likewise, if the value stored during block 845 is greater than the value stored during block 835, then decreasing the control signal per block 840 may result in the electronic device 500 getting closer to its target frequency than increasing the control signal per block 830. Thus, the controller 615 may decrease the frequency of the control signal to the motor 520 by increasing the reference value stored in the storage unit 605 per block 860 and then control may flow back to block 830 where the dithering process begins again.

The dithering operations shown in blocks 830-845 are merely illustrative of the operations that may be implemented in determining the maximum target frequency of the electronic device 500 in its current operating environment and the operations 800 shown in FIG. 8 may vary in other embodiments. For example, in some embodiments, there may be a disproportionate number of increases (block 830) in the control signal compared to decreases (block 840) in the control signal or vice versa. Also, in some embodiments, instead of modifying the frequency of the control signal, other portions of the control signal, such as the duty cycle or amplitude of the voltage, may be modified during the dithering process.

In still other embodiments, the maximum target frequency may be determined by stepping through reference values incrementally. For example, the reference value stored in the storage unit 605 may be substantially zero (e.g., on the order of several hertz) and this reference value may be stepped up from this initial value to a maximum reference value. As this reference value is stepped and the control system 600 reacts to this changing reference value, the measurement of the accelerometer 510 may be stored by the processor 516 in order to find a maximum target frequency of the electronic device 500. By stepping through a range of reference values in this manner, the processor 516 may determine if there are multiple harmonic target frequencies in the target frequency spectrum of the electronic device 500 and determine which of these harmonics produces the largest target frequency of the electronic device 500.

Because one or more characteristics of the motor 520 may vary as a function of temperature (e.g., the electrical resistance of windings in the motor may increase with temperature), wear (e.g., the brushes that commutate the windings in the motor 520 may have an increasing the electrical resistance over time), and/or friction (e.g., the internal bearing structures of the motor 520 may have an increase in the amount of friction over time, causing the motor to spin more slowly in response to applied voltage). These characteristics may include macro scale changes due to aging and wear and/or micro scale changes due to temporary heating in a hot car or due to the generation of heat in the motor windings during operation. Using one or more of the above identified methods, the motor 520 may be operated in such a manner so as to counteract one or more of these effects. For example, using a PWM control signal, in conjunction with measurements from the one or more sensors, changes in performance of the motor 520 as a function of time may be compensated for. Such measurements could be inferred indirectly from measurements of the armature resistance of the motor 520 (e.g., to compensate for temperature/brush wear) or directly from measurements of motor speed at a known duty cycle (e.g., using the accelerometer 510). In addition, while these degradations in performance may be compensated for, they may also be used to trigger a repair or diagnostic history to be communicated to the user, or to the manufacturer or seller of the device.

Figure 9:
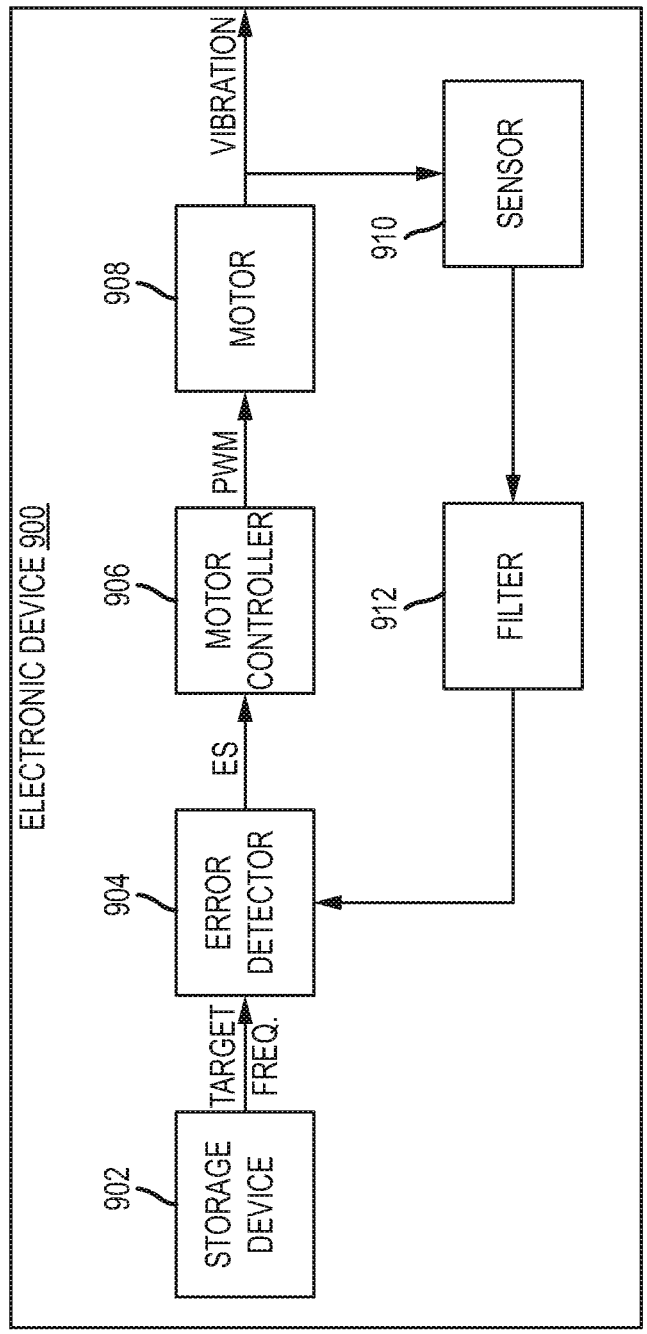
FIG. 9 illustrates an electronic device with a feedback and control system for adjusting operating parameters of a haptic device.

FIG. 9 illustrates an example electronic device 900 having a feedback loop for controlling the operating parameters of a haptic device. The electronic device 900 may include any or all of a storage device 902, an error detector 904, a motor controller 906, a motor 908, a sensor 910 and a filter 912, as shown, as well as other components and/or devices. The motor controller 906 may utilize an error signal provided from the error detector 904 to control the operating signals provided to the motor 908. In particular, the motor controller 906 may adjust the frequency, amplitude and/or duty cycle of a PWM control signal to control the operating parameters of the motor 908.

Figure 10:
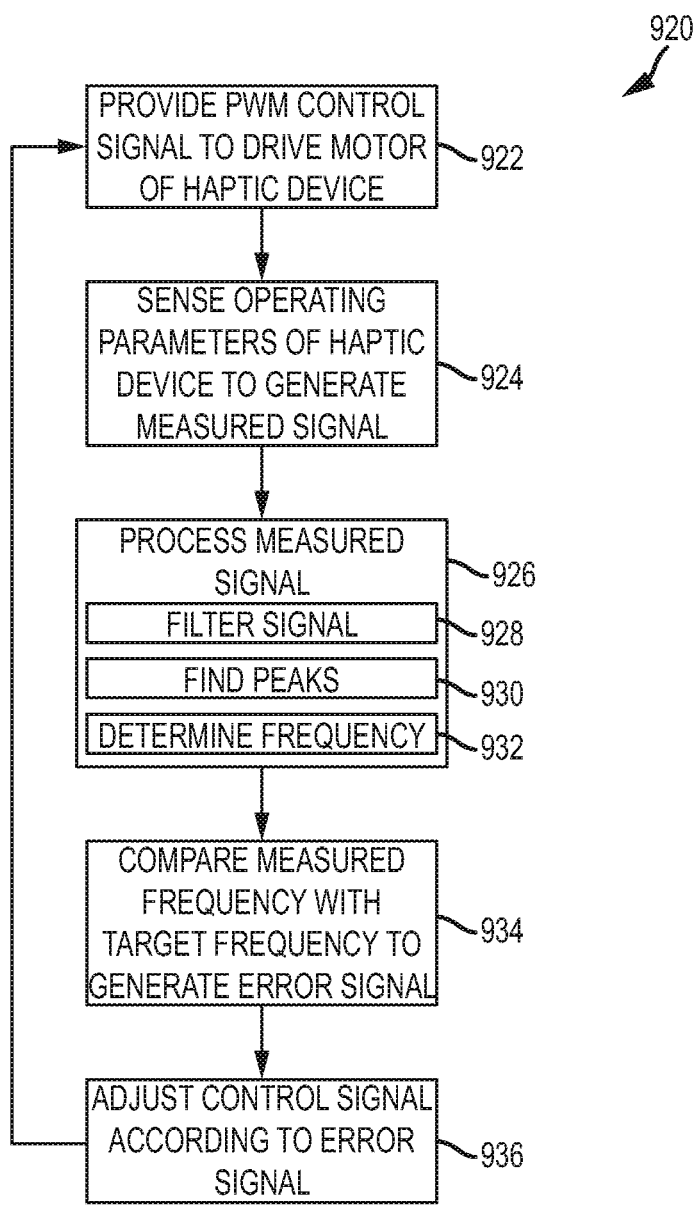
FIG. 10 is a flowchart illustrating operation of the electronic device of FIG. 9 in accordance with an example embodiment.

Turning to FIG. 10, a flowchart 920 illustrating operation of the electronic device 900 in accordance with the embodiment of FIG. 9 is shown. Generally, the flowchart 920 relates to using an accelerometer to sense vibrations of a haptic device. However, it should be appreciated that the same or similar steps to those shown in the flowchart 920 may be implemented with other sensors and other haptic (or other output) devices to achieve a desired level of control for such devices. For example, thermocouples, gyroscopes, compasses, and so on may be used to monitor or sense parameters related to the operation of a motor used in a fan or a hard drive and provide a feedback signal. In some embodiments, the measurements may be taken directly while in other embodiments, indirect measurements may be taken. That is, it should be appreciated that in some embodiments, effects of the operation of the motor is measured (i.e., the vibration from the motor) rather than the actual operation parameters. For the purposes of this discussion, however, the term "operating parameters refers" to measurements related to the operation of the motors and is not exclusive to either the effects of operation or the actual operation parameters.

In some embodiments, one or more sensors may be repurposed from a primary purpose, or additionally used, to sense the operation of the motor. For example, an accelerometer may be repurposed to determine the operating frequency of a haptic device. That is, measurements from an accelerometer may generally be used to determine an orientation of the device 100 and/or may be used with interactive software, such as a video game, to provide an additional input device for user gameplay as primary purposes. Upon actuation of a haptic element, the accelerometer may be repurposed to measure the operating parameters of the haptic element, such as the amount of vibration induced in the device 100 by the haptic element. As such, it should be appreciated that a sensor(s) already provided with a particular electronic device may be used to monitor the operation of a haptic element.

Returning to FIG. 10, a PWM control signal is provided from the controller 906 to the motor 908 to drive the motor (Block 922). As voltage is provided to the motor 908 via the PWM control signal, current rises and drives the motor which results in a vibration/acceleration output that may be sensed by a user. The operation of the motor is also sensed by sensor 910 to generate a measured signal (Block 924). The measured signal is then processed (Block 926). In one embodiment, an output of the sensor 910 is filtered with a bandpass or notch filter 912 to allow vibrations having frequencies near the target operating frequency of the haptic element to be passed through for further processing, thus eliminating acceleration measurements unrelated to the motor (Block 928). Peaks within the filtered signal are found (Block 930) and the frequency of the measured signal is then determined (Block 932). The finding of peaks of the filtered signal may be used to determine a period of the measured signal. The period may then be converted into a frequency signal, for example, for a comparison as detailed below with respect to Block 934. Generally, if the period is determined to be longer than a period corresponding to the target frequency, it indicates that the motor is operating at a speed slower than the target frequency.

In some embodiments, the error detector 904 may include software, hardware and/or a combination of the two and may be configured to convert the filtered signals from the sensor 910 and filter 912 into a signal having units indicative of an operating parameter of the motor 908, such as frequency, temperature, angular velocity, and so on. In other embodiments, discrete components other than the error detector 904 may be used to convert the measured signal into units that may indicate an operating parameter for the motor 108.

The measured frequency is compared with a target frequency provided from the storage device 902 to the error detector 904 to generate an error signal (Block 934). The generated error signal is provided to the motor controller 906 and the control signal is adjusted according to the error signal (Block 936). In one embodiment, a duty cycle of a PWM control signal may be adjusted by the control law 908 to achieve the target frequency. For example, to increase the current in the motor armature, the duty cycle of the PWM control signal may be increased. The control signal is then provided to the motor 908 to drive the motor (Block 922).

In some embodiments, the motor controller 906 may store or have access to information related to the target frequency and/or the torque and angular speed curve information so that it may appropriately adjust the control signal to achieve the target frequency. As such, in some embodiments, the information accessible by the controller 906 may serve as a reference point for the operation of the haptic element to determine changed circumstances related to the operation of the haptic element over time, thus allowing for adjustment of the operating parameters to achieve and/or maintain operations at or near desired operating parameters.

Figure 11:
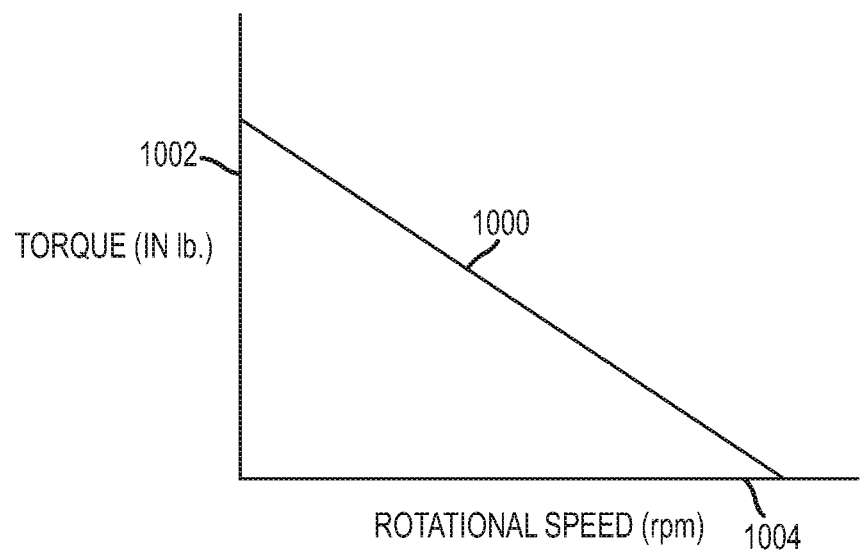
FIGS. 11-13 illustrate example torque and angular speed curves for a haptic device.
Figure 12:
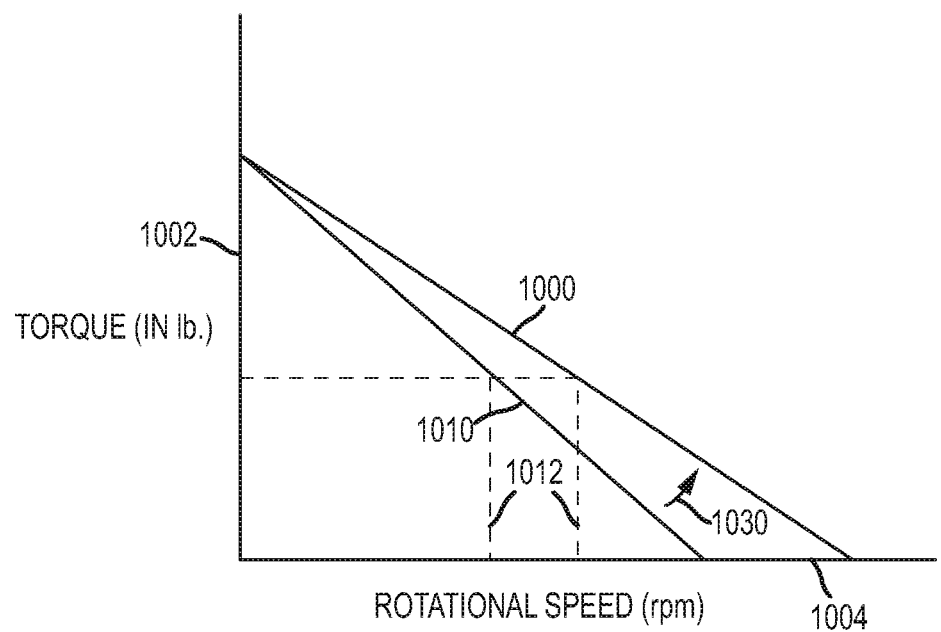
Figure 13:
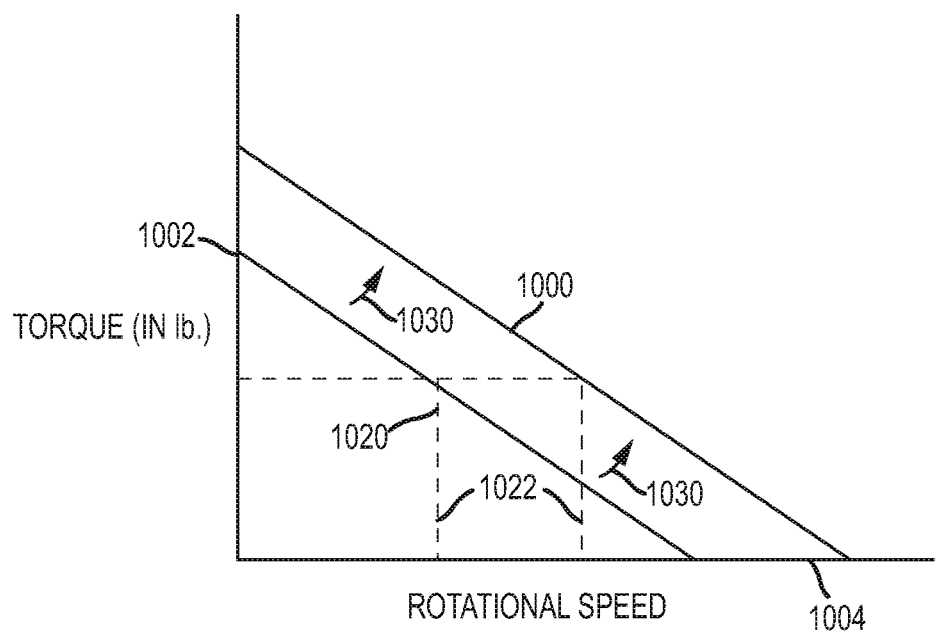

FIGS. 11-13 illustrate example torque and angular speed curves. In particular, FIG. 11 illustrates an example torque and angular speed curve 1000 which may be representative for the motor 908. The vertical axis 1002 represents the torque which may have suitable units such as inches pounds or the like, while the horizontal axis 1004 represents the angular speed which may have suitable units such as revolutions per min (RPMs) or the like. In some embodiments, the curve 1000 may be generally linear, as illustrated, while in other embodiments the curve may be non-linear.

FIG. 12 illustrates sample torque and angular speed curves 1000, and a sample pivoted curve 1010, after the motor 908 has experienced wear, aging, and/or other effects that increase the friction of the motor and degrade the operation of the motor 908. Generally and as shown in the pivoted curve 1010, the increased friction causes the curve 1010 to pivot downward from a point along the vertical axis resulting in lower operating speeds. FIG. 13 illustrates the torque and angular speed curve 1000 and a shifted curve 1020 resulting from high operating temperatures. As shown, the shifted curve 1020 results also in lower operating speeds. In FIGS. 12 and 13, the dashed lines 1012 and 1022 indicate the lower speeds achieved when the motor operates at a constant torque. The lowered speeds illustrated by the pivoted curve 1010 and the shifted curve 1020 and indicative of slower operating speeds for the motor 916 may also result in poor performance of a haptic element as it is not operating at the target frequency.

In order to achieve operation at the target frequency, the speed of the motor 916 may be increased by adjustment of the PWM control signal. Specifically, the duty cycle of the PWM control signal can be adjusted to increase the current in the armature of the motor 908 and thereby increase the speed of the motor to achieve the target frequency. Thus, the PWM control signal allows for adjustments to be made to the operating parameters of the motor while providing a constant voltage level signal and acts as a variable voltage drive without actual varying the voltage level.

The increased current increases the PWM cycle of the motor, and thus moves the pivoted curve 1010 and the shifted curve 1020 so that they reflect the original curve 1000, as indicated by arrows 1030 in FIGS. 12 and 13. It should be appreciated that the pivoted and shifted curves 1010 and 1020 and the corresponding shifts due to increased current are simply presented as examples. In other contexts, due to certain operating conditions, the curves may be shifted and or pivoted in an opposite direction.

In addition to testing and adjusting of the operating parameters of the motor 908, periodically or at random intervals, the operating parameters may be tested for informational purposes. That is, the operation of the motor may be audited to discover how the motor is performing. This may be useful to a manufacturer or reseller to know how an installed base of motors is performing. Thus, the information related to the operation of the motor (i.e., the information collected by the sensor 910) may be transmitted or provided to a computer database owned, operated or accessed by a manufacturer, for example, for informational purposes. The transmittal of the information may be via any suitable mode including wired and wireless modes. Moreover, the transmittal may be passive and unnoticeable to a user of the device. In some embodiments, the information may be provided to a user interface of the device in which the haptic element is operating to inform a user of any performance issues. This may be useful for knowing when a cooling fan is not operating properly, for example, so that it may be fixed before a system overheats or to know when a hard disk drive is beginning to fail.

In the foregoing examples, it should be appreciated that the motion of a device is measured to control a haptic element within the device. Thus, not only is the sensor (e.g., accelerometer) being used for a secondary purpose, it also takes an indirect measurement in order to tune the haptic (or other) device. The feedback loop may include one or more sensors and the sensors implemented may take various different measurements. For example, in some embodiments, a thermocouple may be used for measuring a device temperature to infer a motor operating temperature. In another embodiment, a microphone may be used for measuring a ringtone volume or quality. In some embodiments, the microphone may also be used to determine a volume for a hard disk drive when spinning. In some embodiments, a gyroscope may be used to determine acceleration of a device when a vibrating haptic element is actuated.

Figure 14:
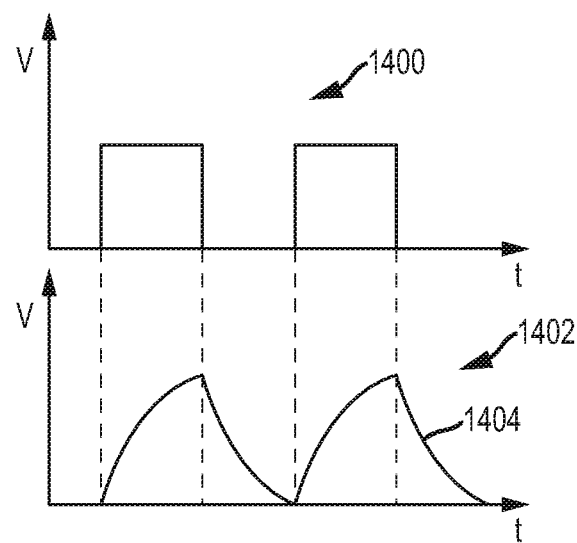
FIGS. 14 and 15 illustrate drive signals and corresponding vibration amplitudes for haptic devices.
Figure 15:
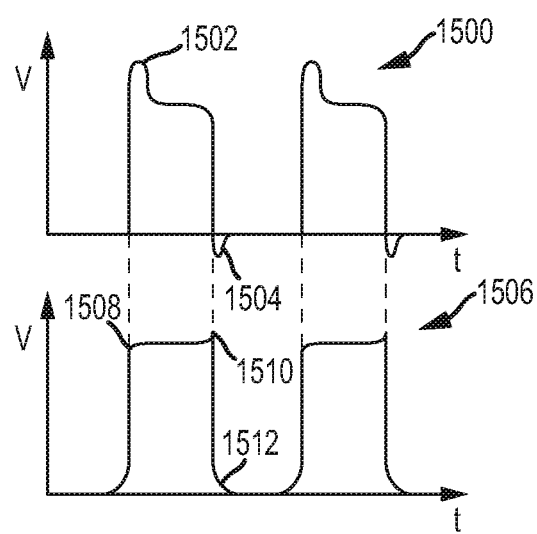

In some embodiments, the ramp up and stopping of motors may be improved. FIGS. 14 and 15 illustrate drive control curves with corresponding vibration amplitudes. Specifically, FIG. 14 illustrates a traditional on/off drive control signal 1400 for the motor 908 with voltage in the vertical axis and time in the horizontal axis. A corresponding vibration amplitude curve 1402 is illustrated below the traditional drive control signal. The vibration amplitude has a sawtooth form 1404 because the mechanical time constant of the vibration motor may be long with respect to the input signal, resulting in a slow rise time and a "soft" feel to transition between on an off vibration.

In contrast, FIG. 15 illustrates a drive control curve 1500 and a corresponding vibration amplitude curve 1506 achievable using PWM control signals. As illustrated, the drive control curve 1500 is overdriven in the rise 1502 and in the spin down 1504, resulting in crisper rise time in the vibration amplitude 1508 and in the vibration spin down 1510 and 1512. Generally, the rise time can be overdriven in a PWM control signal by increasing the duty cycle of the signal. The spin down time after an one signal can be reduced by shorting the leads of the motor to generate an inductive braking effect on the motor or by applying an opposite polarity to the leads to actively brake the motor. These techniques provide a crisper, more noticeable transient between the on and off states of a vibrating alert device.

Although concepts have been presented in relation to specific embodiments, it should be appreciated, that the concepts may be applicable over a number embodiments not specifically described herein but falling within the scope of the present disclosure. For example, the Accordingly, embodiments disclosed herein are not to be construed as limiting.

What is claimed is:

1. An electronic device that autonomously adjusts at least one operating parameter of a haptic device, the electronic device comprising:
- a haptic device;
- a sensor configured to monitor the haptic device during operation of the haptic device and generate a measured signal;
- a feedback loop comprising:
- a filter coupled to the sensor and operative to filter the measured signal, thereby generating a filtered measured signal; and
- an error detector coupled to the filter, wherein the error detector is configured to compare the filtered measured signal with a target signal to generate an error signal; and
- a controller configured to receive the error signal and adjust a control signal in response to the error signal to achieve a desired operational parameter.

2. The electronic device of claim 1, wherein the sensor is an accelerometer.

3. The electronic device of claim 2, wherein values from the accelerometer are iteratively used by the electronic device to adjust the control signal.

4. The electronic device of claim 3, wherein the control signal is a pulse width modulation signal.

5. The electronic device of claim 1, the electronic device is a phone and the adjustment of the control signal occurs within an integer number of rings of the phone.

6. The electronic device of claim 1, wherein the haptic device is a vibrating device.

* * * * *